(12) United States Patent
Bonde et al.

(10) Patent No.: US 6,742,488 B2
(45) Date of Patent: Jun. 1, 2004

(54) COMPONENT FOR GOVERNING AIR FLOW IN AND AROUND CYLINDER HEAD PORT

(75) Inventors: Kevin G. Bonde, Kiel, WI (US); Yun Huang, Sheboygan, WI (US); Terrence M. Rotter, Sheboygan Falls, WI (US); Steven P. Lewis, Howards Grove, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 10/199,163

(22) Filed: Jul. 18, 2002

(65) Prior Publication Data

US 2004/0011317 A1 Jan. 22, 2004

(51) Int. Cl.[7] ............................................... F02M 35/10
(52) U.S. Cl. ................................................. 123/184.21
(58) Field of Search .................................... 123/184.21

(56) References Cited

U.S. PATENT DOCUMENTS

| | | |
|---|---|---|
| 1,172,612 A | 2/1916 | Kremer |
| 1,301,007 A | 4/1919 | Roof |
| 1,410,019 A | 3/1922 | Krause |
| 1,469,063 A | 9/1923 | Wills |
| 1,590,073 A | 6/1926 | Birkigt |
| 1,684,955 A | 9/1928 | Goodwin |
| 2,235,160 A | 3/1941 | Ljungstrom |
| 2,459,594 A | 1/1949 | Smith |
| 3,118,433 A | 1/1964 | Lechtenberg |
| 3,195,526 A | 7/1965 | Jordan |
| 3,200,804 A | 8/1965 | Hensler et al. |
| 3,314,408 A | 4/1967 | Fenton |
| 3,407,741 A | 10/1968 | Weber et al. |
| 3,457,804 A | 7/1969 | Harkness |
| 3,561,416 A | 2/1971 | Kiekhafer |
| 3,751,080 A | 8/1973 | Bailey et al. |
| 3,818,577 A | 6/1974 | Bailey et al. |

(List continued on next page.)

FOREIGN PATENT DOCUMENTS

| | | |
|---|---|---|
| DE | 3120190 A1 | 5/1982 |
| UA | 355365 | 8/1931 |
| UA | 378216 | 8/1932 |
| WO | WO 86/04122 A1 | 7/1986 |
| WO | WO 00/43655 A1 | 7/2000 |

OTHER PUBLICATIONS

"Technical Innovations–Briggs & Stratton extends engine life", SAE Off–Highway Engineering, Oct. 2001, p. 4.
3 undated photographs of Briggs & Stratton balance system, admitted prior art.

*Primary Examiner*—Noah P. Kamen
(74) *Attorney, Agent, or Firm*—Quarles & Brady LLP (57) ABSTRACT

A cylinder head assembly and a method of providing an air-fuel mixture from a carburetor to a cylinder of an internal combustion engine are disclosed. The cylinder head assembly includes a cylinder head and a component coupled to the cylinder head. The cylinder head includes a first port having a first passage linking a first end to an intersection, and a second passage linking a second end to the intersection, where the intersection includes an abrupt transition between the first and second passages. The component includes a tongue that protrudes into the first passage from the first end to proximate the intersection, where the tongue is positioned along at least a portion of an inner side of the first passage, and where the tongue is gradually-reduced in thickness at least proximate the intersection.

23 Claims, 8 Drawing Sheets

U.S. PATENT DOCUMENTS

| | | |
|---|---|---|
| 4,030,179 A | 6/1977 | Schwarz |
| 4,097,702 A | 6/1978 | Halsted |
| 4,185,717 A | 1/1980 | Ford, Jr. et al. |
| 4,198,879 A | 4/1980 | Hornak et al. |
| 4,283,607 A | 8/1981 | Brightman |
| 4,285,309 A | 8/1981 | Johansson |
| 4,308,830 A | 1/1982 | Yamada et al. |
| 4,332,222 A | 6/1982 | Papez |
| 4,336,777 A | 6/1982 | Yanagihara et al. |
| 4,366,787 A | 1/1983 | Gale |
| 4,372,258 A | 2/1983 | Iwai |
| 4,380,216 A | 4/1983 | Kandler |
| 4,391,231 A | 7/1983 | TateBe et al. |
| 4,401,067 A | 8/1983 | Honda |
| 4,414,934 A | 11/1983 | Vogl et al. |
| 4,422,348 A | 12/1983 | Campbell |
| 4,433,651 A | 2/1984 | Nakakita et al. |
| 4,446,828 A | 5/1984 | Bauder et al. |
| 4,452,194 A | 6/1984 | Watanabe |
| 4,458,555 A | 7/1984 | Holtzberg et al. |
| 4,465,034 A * | 8/1984 | Tsutsumi ............... 123/184.21 |
| 4,507,917 A | 4/1985 | Kandler |
| 4,510,897 A | 4/1985 | Hatz et al. |
| 4,530,318 A | 7/1985 | Semple |
| 4,534,241 A | 8/1985 | Remmerfelt et al. |
| 4,548,253 A | 10/1985 | Funatani et al. |
| 4,569,109 A | 2/1986 | Fetouh |
| 4,570,584 A | 2/1986 | Uetsuji et al. |
| 4,617,122 A | 10/1986 | Kruse et al. |
| 4,622,933 A | 11/1986 | Fukuo et al. |
| 4,644,912 A | 2/1987 | Umeha et al. |
| 4,656,981 A | 4/1987 | Murata et al. |
| 4,660,512 A | 4/1987 | Binder et al. |
| 4,672,930 A | 6/1987 | Sumi |
| 4,674,455 A | 6/1987 | Tsuboi |
| 4,684,267 A | 8/1987 | Fetouh |
| 4,688,446 A | 8/1987 | Ishikawa |
| 4,691,590 A | 9/1987 | Geringer et al. |
| 4,696,266 A | 9/1987 | Harada |
| 4,711,823 A | 12/1987 | Shiina |
| 4,736,717 A | 4/1988 | Fujikawa et al. |
| 4,793,297 A | 12/1988 | Fujii et al. |
| 4,802,269 A | 2/1989 | Mukai et al. |
| 4,819,592 A | 4/1989 | van Ligten |
| 4,819,593 A | 4/1989 | Bruener et al. |
| 4,822,414 A | 4/1989 | Yoshikawa et al. |
| 4,828,632 A | 5/1989 | Adam et al. |
| 4,834,784 A | 5/1989 | Bidanset |
| 4,836,045 A | 6/1989 | Lobig |
| 4,838,909 A | 6/1989 | Bidanset |
| 4,853,179 A | 8/1989 | Shiina |
| 4,867,806 A | 9/1989 | Shiina |
| 4,892,068 A | 1/1990 | Coughlin |
| 4,898,133 A | 2/1990 | Bader |
| 4,909,197 A | 3/1990 | Perr |
| 4,926,814 A | 5/1990 | Bonde |
| 4,928,550 A | 5/1990 | Sakai et al. |
| 4,934,442 A | 6/1990 | Futamura et al. |
| 4,949,687 A | 8/1990 | Emmersberger |
| 4,958,537 A | 9/1990 | Diehl et al. |
| 4,964,378 A | 10/1990 | Tamba et al. |
| 4,986,224 A | 1/1991 | Zuffi |
| 5,002,023 A | 3/1991 | Butterfield et al. |
| 5,038,727 A | 8/1991 | Burns et al. |
| 5,057,274 A | 10/1991 | Futamura et al. |
| 5,085,184 A | 2/1992 | Yamada et al. |
| 5,152,264 A | 10/1992 | Evans |
| 5,163,341 A | 11/1992 | Murrish et al. |
| 5,197,422 A | 3/1993 | Oleksy et al. |
| 5,197,425 A | 3/1993 | Santi |
| 5,207,120 A | 5/1993 | Arnold et al. |
| 5,241,873 A | 9/1993 | Hormann |
| 5,243,878 A | 9/1993 | Santi |
| 5,265,700 A | 11/1993 | Santi |
| 5,282,397 A | 2/1994 | Harkness et al. |
| 5,323,745 A | 6/1994 | Sato et al. |
| 5,357,917 A | 10/1994 | Everts |
| 5,370,093 A | 12/1994 | Hayes |
| 5,375,571 A | 12/1994 | Diehl et al. |
| 5,421,297 A | 6/1995 | Tamba et al. |
| 5,463,809 A | 11/1995 | Hoffman et al. |
| 5,497,735 A | 3/1996 | Kern et al. |
| 5,555,776 A | 9/1996 | Gazza |
| 5,556,441 A | 9/1996 | Courtwright et al. |
| 5,560,333 A | 10/1996 | Genouille |
| 5,615,586 A | 4/1997 | Phillips et al. |
| 5,651,336 A | 7/1997 | Rygiel et al. |
| 5,711,264 A | 1/1998 | Jezek et al. |
| 5,809,958 A | 9/1998 | Gracyalny |
| 5,823,153 A | 10/1998 | Santi et al. |
| 5,863,424 A | 1/1999 | Lee |
| 5,887,678 A | 3/1999 | Lavender |
| 5,904,124 A | 5/1999 | Poehlman et al. |
| 5,964,198 A | 10/1999 | Wu |
| 5,979,392 A | 11/1999 | Moorman et al. |
| 5,988,135 A | 11/1999 | Moorman et al. |
| 6,006,721 A | 12/1999 | Shannon et al. |
| 6,047,667 A | 4/2000 | Leppanen et al. |
| 6,055,952 A | 5/2000 | Gau |
| 6,076,426 A | 6/2000 | Genouille |
| 6,109,230 A | 8/2000 | Watanabe et al. |
| 6,116,205 A | 9/2000 | Troxler et al. |
| 6,126,499 A | 10/2000 | Katayama et al. |
| 6,170,449 B1 | 1/2001 | Saiki et al. |
| 6,213,081 B1 | 4/2001 | Ryu et al. |
| 6,269,786 B1 | 8/2001 | Snyder et al. |
| 6,293,981 B1 | 9/2001 | Holderle et al. |
| 6,395,049 B2 | 5/2002 | Knodler et al. |

* cited by examiner

COMPONENT FOR GOVERNING AIR FLOW IN AND AROUND CYLINDER HEAD PORT

FIELD OF THE INVENTION

The present invention relates to internal combustion engines. In particular, the present invention relates to the flow of air-fuel mixture in an engine from a carburetor to a cylinder by way of an intake port of the cylinder head, and also the flow of cooling air around the cylinder head of the engine and the carburetor.

BACKGROUND OF THE INVENTION

The cylinder head of an internal combustion engine includes an intake port into which an air-fuel mixture is delivered from the carburetor of the engine. The intake port is commonly formed from first and second channels that intersect one another at 90 (or approximately 90) degrees, and thus is L-shaped. Typically, the two channels are cylindrical or approximately cylindrical (or conical), e.g., such that the channels have circular or elliptical cross-sections. A carburetor end of the L-shaped intake port, at which is an opening of the first of the two channels, receives the air-fuel mixture from the carburetor. A cylinder end of the L-shaped intake port, at which is an opening of the other of the two channels, interfaces the interior of the cylinder of the engine and forms a valve seat for an intake valve governing the flow of the air-fuel mixture into the cylinder. An additional channel extends beyond the intersection of the first and second channels, parallel to the second channel, and forms a guide/support for the valve stem.

Manufacturing an intake port with this design is relatively simple to perform and therefore cost-effective. Formation of the intake port only requires the casting/diecasting or drilling (from perpendicular angles) of the two channels into the cylinder head. However, an intake port manufactured by way of low cost casting or drilling processes provides for imperfect flow characteristics of the air-fuel mixture within the intake port, which in turn can hinder performance of the engine. In particular, the inner 90 degree corner of the L-shaped intake port introduces a stall region in the flow of the air-fuel mixture. That is, due to the corner, the flow of the air-fuel mixture past the valve into the cylinder is slowed down near the corner. Consequently, the amount of air-fuel mixture that flows into the side of the cylinder proximate the inner 90 degree corner is reduced in comparison with the amount that flows into other portions of the cylinder. As a result, filling of the cylinder is incomplete and so the engine combustion is uneven and less efficient.

Alternate conventional ways of forming an intake port do not substantially resolve these problems and/or introduce other problems. For example, while it is possible to form an intake port from a pair of channels that are at greater than 90 degrees relative to one another (e.g., at 120 degrees), this does not substantially eliminate the problem of stalling of the flow of the air-fuel mixture near the inner corner formed by the intersection of the two channels. Additionally, the diecasting of passages at such obtuse angles is more difficult to perform and therefore more costly. Also for example, while it is possible to ameliorate the effects of the inner corner by grinding away the corner (or "porting the head"), such process is also relatively difficult and costly to perform and, in particular, is difficult to perform in a standardized, consistent manner.

Conventional engines also commonly suffer from problems relating to undesirable air circulation characteristics around the outside of the cylinder heads as well. Conventional cylinder heads typically are attached to the carburetors from which the air-fuel mixture is to be provided. This physical attachment/proximity can be undesirable insofar as the heat of the cylinder and cylinder head can be transferred to the carburetor and overheat the carburetor and negatively impact its performance. Indeed, due to the proximity of the carburetor and the cylinder head, it is possible for the heat of the cylinder head to affect the temperature and performance of the carburetor simply by way of the air flow that occurs around these components, particularly cooling air flow supplied by the engine fan.

It would therefore be advantageous if a new cylinder head assembly could be designed in which the flow of air-fuel mixture through the intake port was not significantly stalled, such that the air-fuel mixture was evenly delivered to the cylinder. It would additionally be advantageous if the new cylinder head assembly was designed to reduce the amount of heat transferred from the cylinder and cylinder head to the carburetor attached to the cylinder head. It would further be advantageous if the new cylinder head assembly was simple and not costly to manufacture.

SUMMARY OF THE INVENTION

The present inventors have discovered a component that, when coupled to a conventional cylinder head, reduces the stalling of the flow of air-fuel mixture through the intake port of the cylinder head and consequently improves the delivery of air-fuel mixture to the cylinder, thus improving engine performance. The component is specifically mounted to the cylinder head at the carburetor end of the L-shaped intake port, and includes a tongue that protrudes into the intake port. The tongue extends along a side of the first passage of the L-shaped intake port from the carburetor end up to the inner 90 degree corner of the L-shaped intake port. The surface of the tongue, along with the remaining exposed portion of the first passage, forms a modified passage extending from the carburetor end to the inner 90 degree corner of the L-shaped passage. The surface of the tongue is tapered and/or rounded as it approaches the inner 90 degree corner such that, given the addition of the tongue, stalling of the flow of air-fuel mixture is largely or entirely eliminated. By employing a tongue to modify the L-shaped intake port, the L-shaped intake port can still be manufactured using conventional, low-cost casting or drilling techniques.

The shape of the modified passage created by the first passage and tongue can vary depending upon the embodiment. In some embodiments, the first passage has a tapered surface opposite the surface at which the tongue is to be positioned, such that the first passage is elliptical in cross-section and decreases in cross-sectional area as one proceeds toward the inner 90 degree corner. In certain of these embodiments, the addition of the tongue tends to create a modified passage that is largely cylindrical and that intersects the second passage at greater than 90 degrees.

In certain embodiments, the component is attached to the carburetor end of the L-shaped intake port in between the cylinder head and the carburetor, which are both attached to the component on opposite sides of the component. The component is preferably manufactured from a heat resistant material such that heat transfer from the cylinder head to the carburetor through the component is limited. Further, in some embodiments, the component includes a baffle that extends outward on either side of the interface between the carburetor and the cylinder head, further extends outward to curve over the carburetor, and further extends outward to curve under the cylinder head. Thus, air flow from the cylinder head to the carburetor is limited, and cooling air from the fan is primarily directed toward the cylinder head and away from the carburetor.

In particular, the present invention relates to a cylinder head assembly comprising a cylinder head and a component coupled to the cylinder head. The cylinder head includes a first port having a first passage linking a first end to an intersection, and a second passage linking a second end to the intersection, where the intersection includes an abrupt transition between the first and second passages. The component includes a tongue that protrudes into the first passage from the first end to proximate the intersection, where the tongue is positioned along at least a portion of an inner side of the first passage, and where the tongue is gradually-reduced in thickness at least proximate the intersection.

The present invention further relates to a component for implementation in an internal combustion engine, the component being positioned in between a cylinder head and a carburetor of the engine. The component includes means for protruding into a port of the cylinder head and limiting stalling of a flow of air-fuel mixture within the port.

The present invention additionally relates to a method of providing an air-fuel mixture from a carburetor to a cylinder of an internal combustion engine. The method includes providing a cylinder head with an L-shaped intake port formed by first and second channels that interconnect at an abrupt intersection, where a first end of the L-shaped intake port is coupled at least indirectly to the carburetor to receive the air-fuel mixture from the carburetor, and where a second end of the L-shaped intake port is coupled to the cylinder. The method further includes providing a tongue within the first channel of the L-shaped intake port between the first end and the intersection, where an internal volume of the L-shaped intake port that is open for conducting the air-fuel mixture is reduced by the tongue. The method additionally includes providing the air-fuel mixture from the carburetor to the first end of the L-shaped intake port, and directing the air-fuel mixture through the internal volume of the L-shaped intake port as reduced by the tongue. The method further includes communicating the air-fuel mixture past an open valve and into the cylinder, where an abruptness of the abrupt intersection between the first and second channels is reduced by the tongue.

DETAILED DESCRIPTION OF THE PREFERRED EMBODIMENT

Figure 1:
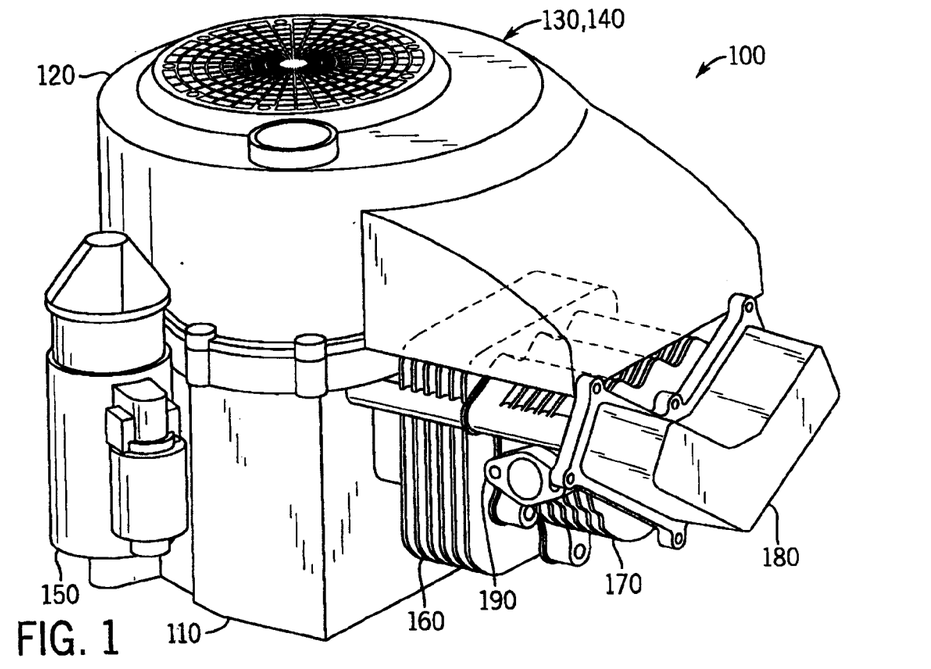
FIG. 1 is a first perspective view of a single cylinder engine, taken from a side of the engine on which are located a starter and cylinder head.
Figure 2:
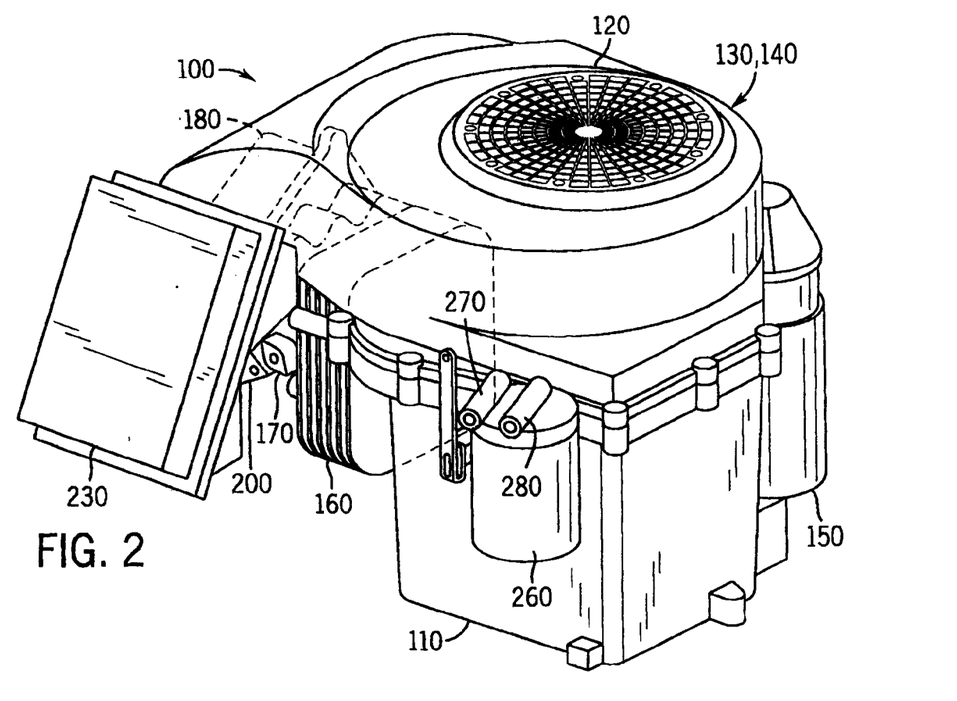
FIG. 2 is a second perspective view of the single cylinder engine of FIG. 1, taken from a side of the engine on which are located an air cleaner and oil filter.

Referring to FIGS. 1 and 2, a new single cylinder, 4-stroke, internal combustion engine 100 designed by Kohler Co. of Kohler, Wis. includes a crankcase 110 and a blower housing 120, inside of which are a fan 130 and a flywheel 140. The engine 100 further includes a starter 150, a cylinder 160, a cylinder head 170, and a rocker arm cover 180. Attached to the cylinder head 170 are an exhaust port 190 shown in FIG. 1 and an intake port 200 shown in FIG. 2. As is well known in the art, during operation of the engine 100, a piston 210 (see FIG. 7) moves back and forth within the cylinder 160 towards and away from the cylinder head 170. The movement of the piston 210 in turn causes rotation of a crankshaft 220 (see FIG. 7), as well as rotation of the fan 130 and the flywheel 140, which are coupled to the crankshaft. The rotation of the fan 130 cools the engine, and the rotation of the flywheel 140, causes a relatively constant rotational momentum to be maintained.

Referring specifically to FIG. 2, the engine 100 further includes an air filter 230, which filters the air required by the engine. From the air filter 230, the air is then provided to a carburetor 510, which mixes fuel with the air (see FIGS. 9–10). Then, the air-fuel mixture is provided to the cylinder head 170 by way of an additional component, as further discussed with respect to FIGS. 9–19. The air provided to the intake port 200 of the cylinder head 170 is communicated to the cylinder 160, and exits the engine by flowing from the cylinder through the exhaust port 190 of the cylinder head 170. The inflow and outflow of air into and out of the cylinder 160 by way of the cylinder head 170 is governed by an intake valve 240 and an exhaust valve 250, respectively (see FIG. 8). Also as shown in FIG. 2, the engine 100 includes an oil filter 260 through which the oil of the engine 100 is passed and filtered. Specifically, the oil filter 260 is coupled to the crankcase 110 by way of incoming and outgoing lines 270, 280, respectively, whereby pressurized oil is provided into the oil filter and then is returned from the oil filter to the crankcase.

Figure 3:
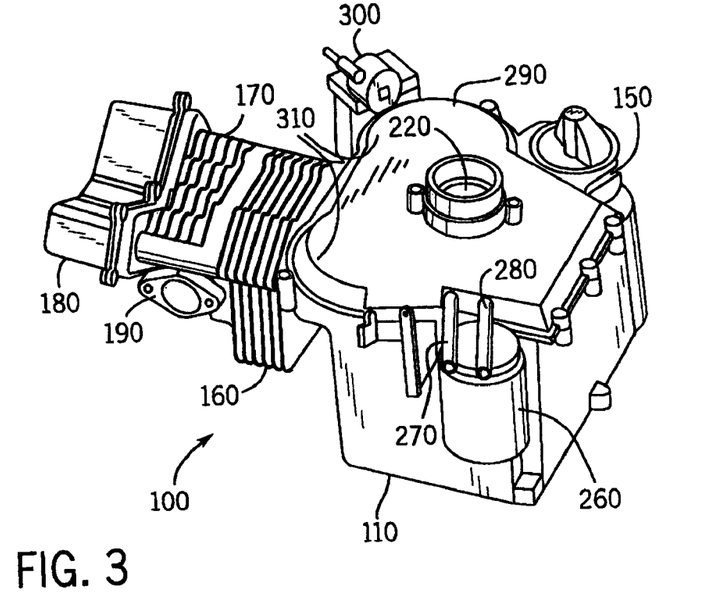
FIG. 3 is a third perspective view of the single cylinder engine of FIG. 1, in which certain parts of the engine have been removed to reveal additional parts of the engine.
Figure 4:
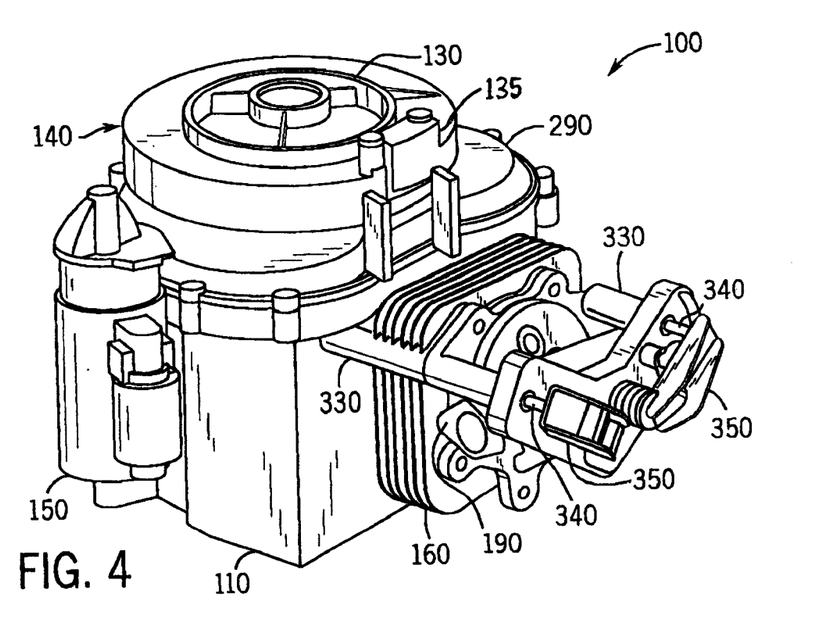
FIG. 4 is a fourth perspective view of the single cylinder engine of FIG. 1, in which certain parts of the engine have been removed to reveal additional parts of the engine.

Referring to FIGS. 3 and 4, the engine 100 is shown with the blower housing 120 removed to expose a top 290 of the crankcase 110. With respect to FIG. 3, in which both the fan 130 and the flywheel 140 are also removed, a coil 300 is shown that generates an electric current based upon rotation of a magnet 135 attached to the flywheel 140 (see FIG. 4). The coil 300 and magnet 135 together operate as a magneto. Additionally, the top 290 of the crankcase 110 is shown to have a pair of projections 310 that cover a pair of gears 320 (see FIGS. 5 and 7–8). With respect to FIG. 4, the fan 130 and the flywheel 140 are shown above the top 290 of the crankcase 110. Additionally, FIG. 4 shows the engine 100 without the rocker arm cover 180, to more clearly reveal a pair of tubes 330 through which extend a pair of respective push rods 340. The push rods 340 extend between a pair of respective rocker arms 350 and a pair of cam follower arms 470 (see FIG. 8) within the crankcase 110, as discussed further below.

Figure 5:
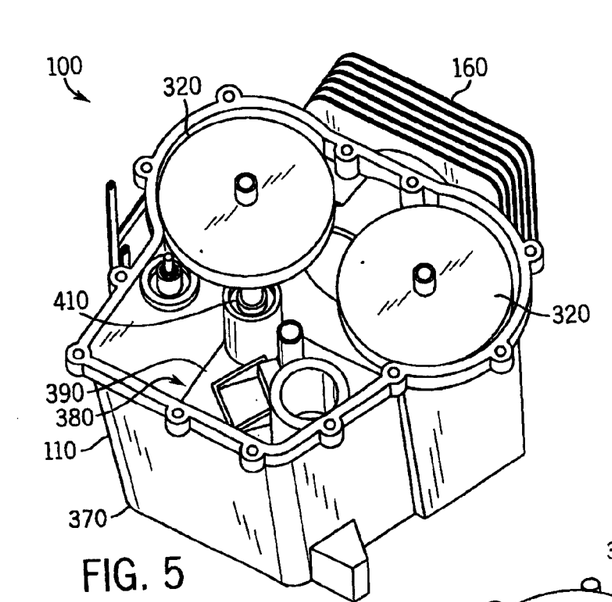
FIG. 5 is fifth perspective view of portions of the single cylinder engine of FIG. 1, in which a top of the crankcase has been removed to reveal an interior of the crankcase.
Figure 6:
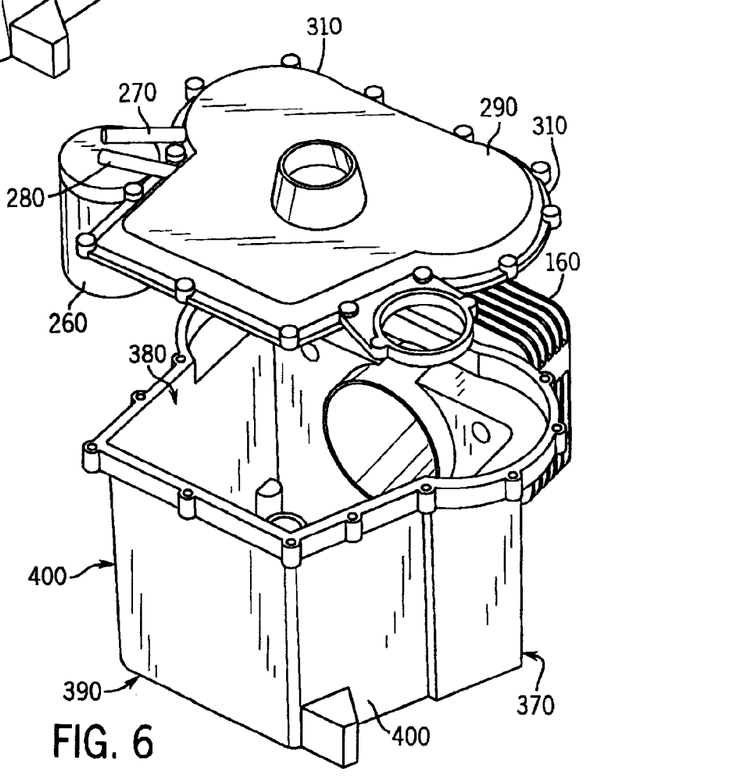
FIG. 6 is a sixth perspective view of portions of the single cylinder engine of FIG. 1, in which the top of the crankcase is shown exploded from the bottom of the crankcase.

Turning to FIGS. 5 and 6, the engine 100 is shown with the top 290 of the crankcase 110 removed from a bottom 370 of the crankcase 110 to reveal an interior 380 of the crankcase. Additionally in FIGS. 5 and 6, the engine 100 is shown in cut-away to exclude portions of the engine that extend beyond the cylinder 160 such as the cylinder head 170. With respect to FIG. 6, the top 290 of the crankcase 110 is shown above the bottom 370 of the crankcase in an exploded view. In this embodiment, the bottom 370 includes not only a floor 390 of the crankcase, but also all four side walls 400 of the crankcase, while the top 290 only acts as the roof of the crankcase. The top 290 and bottom 370 are manufactured as two separate pieces such that, in order to open the crankcase 110, one physically removes the top from the bottom. Also, as shown in FIG. 5, the pair of gears 320 within the crankcase 110 are supported by and rotate upon respective shafts 410, which in turn are supported by the bottom 370 of the crankcase 110.

Figure 7:
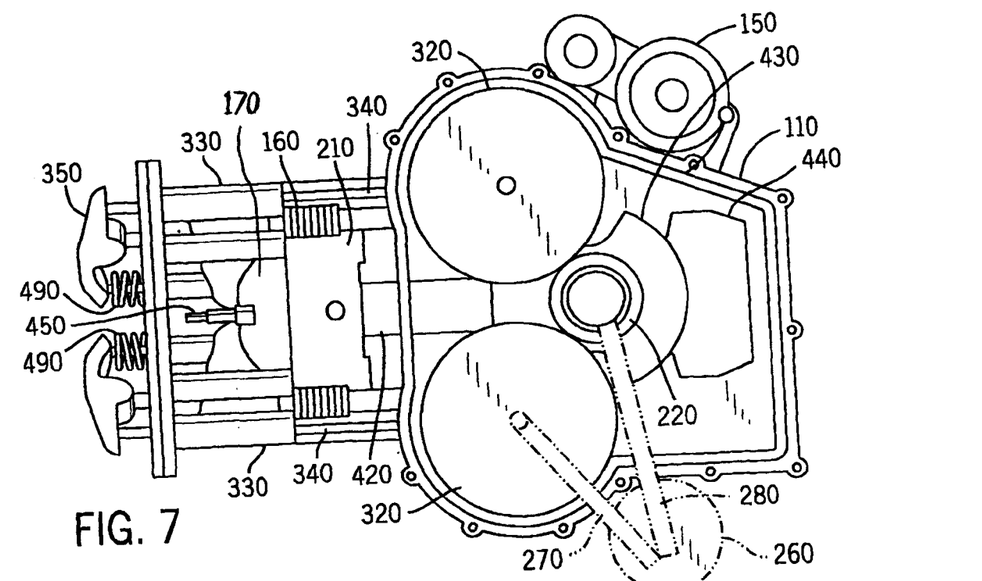
FIG. 7 is a top view of the single cylinder engine of FIG. 1, showing internal components of the engine.

Referring to FIG. 7, a top view of the engine 100 is provided in which additional internal components of the engine are shown. In particular, FIG. 7 shows the piston 210 within the cylinder 160 to be coupled to the crankshaft 220 by a connecting rod 420. The crankshaft 220 is in turn coupled to a rotating counterweight 430 and reciprocal weights 440, which balance the forces exerted upon the crankshaft 220 by the piston 210. The crankshaft 220 further is in contact with each of the gears 320, and thus communicates rotational motion to the gears. In the present embodiment, the shafts 410 upon which the gears 320 are supported are capable of communicating oil from the floor 390 of the crankcase 110 (see FIG. 5) upward to the gears 320. The incoming line 270 to the oil filter 260 is coupled to one of the shafts 410 to receive oil, while the outgoing line 280 from the oil filter is coupled to the crankshaft 220 to provide lubrication thereto. FIG. 7 further shows a spark plug 450 located on the cylinder head 170, which provides sparks during power strokes of the engine to cause combustion to occur within the cylinder 160. The electrical energy for the spark plug 450 is provided by the coil 300 and the rotating magnet 135 (see FIGS. 3 and 4).

Figure 8:
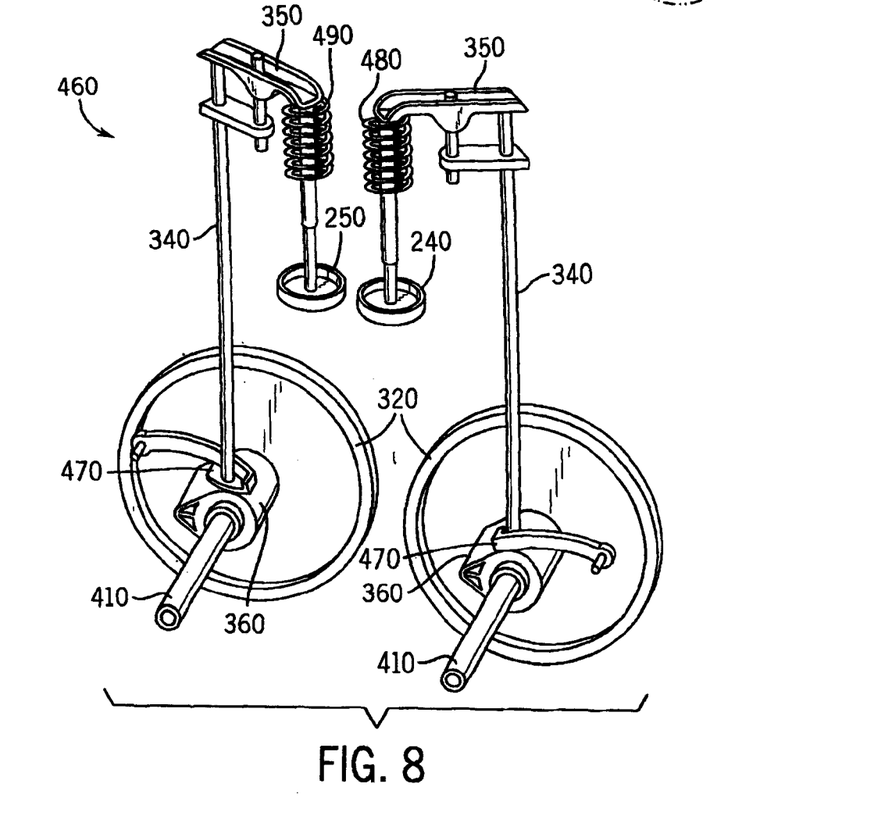
FIG. 8 is a perspective view of components of a valve train of the single cylinder engine of FIG. 1.

Further referring to FIG. 7, and additionally to FIG. 8, elements of a valve train 460 of the engine 100 are shown. The valve train 460 includes the gears 320 resting upon the shafts 410 and also includes the cams 360 underneath the gears, respectively. Additionally, respective cam follower arms 470 that are rotatably mounted to the crankcase 110 extend to rest upon the respective cams 360. The respective push rods 340 in turn rest upon the respective cam follower arms 470. As the cams 360 rotate, the push rods 340 are temporarily forced outward away from the crankcase 110 by the cam follower arms 470. This causes the rocker arms 350 to rock (or rotate about respective pivots), and consequently causes the respective valves 240 and 250 to open toward the crankcase 110. As the cams 360 continue to rotate, however, the push rods 340 are allowed by the cam follower arms 470 to return inward to their original positions. A pair of springs 480,490 positioned between the cylinder head 170 and the rocker arms 350 and attached to the valves 240,250 provide force to close the valves 240,250, respectively. Further as a result of this forcing action of the springs 480,490 upon the valves 240,250, the rocker arms 350 and the push rods 340 are forced back to their original positions.

Figure 9:
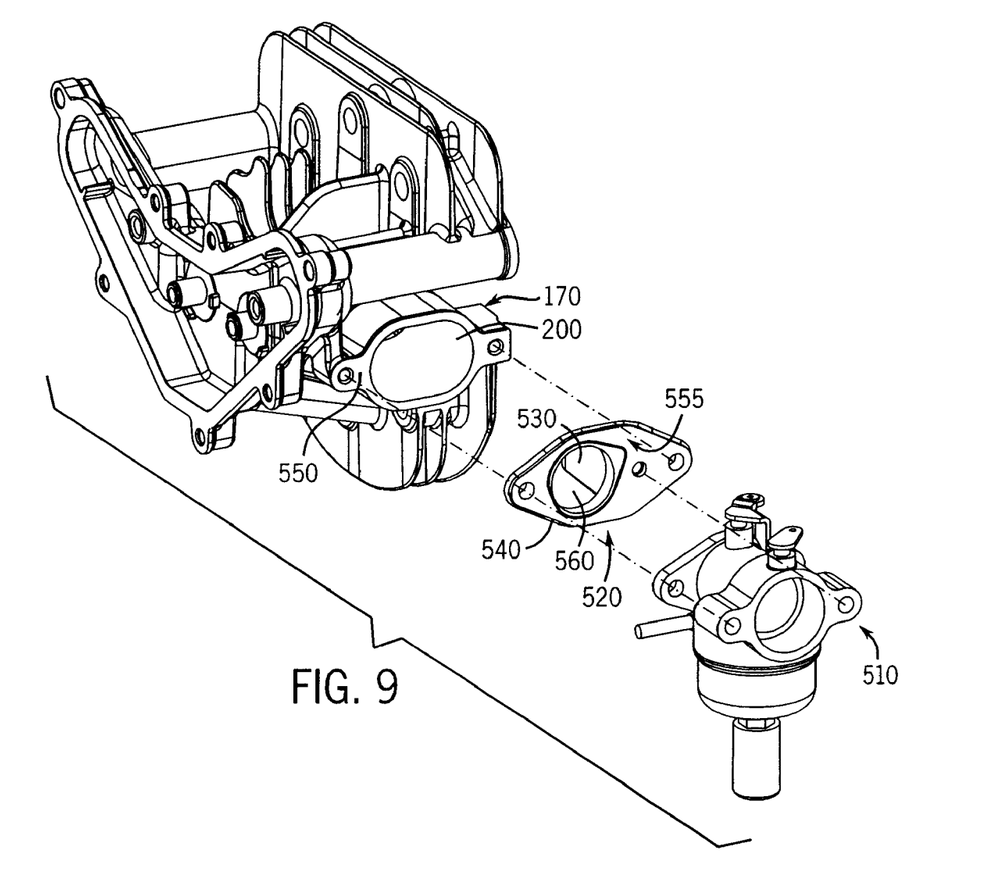
FIGS. 9 and 10 provide perspective, exploded views of a portion of the engine of FIG. 1 including the cylinder head and carburetor of the engine, as well as an additional component to be coupled between the cylinder head and the carburetor.
Figure 10:
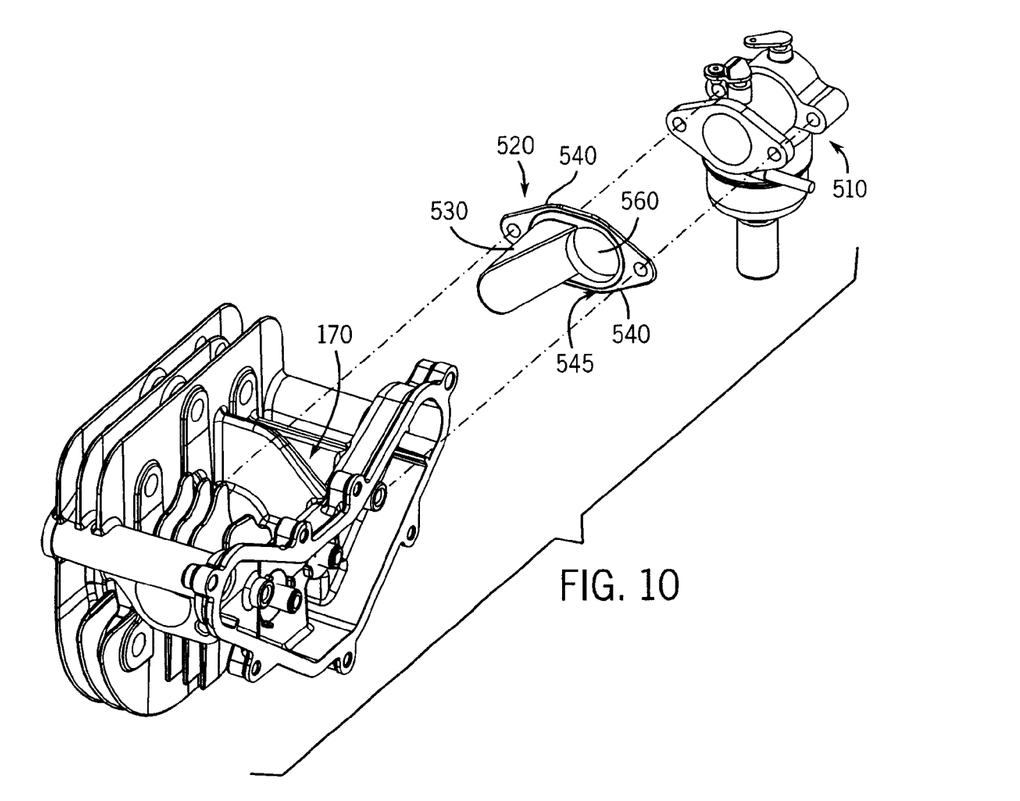

Turning to FIGS. 9 and 10, two perspective, exploded views are provided of a front portion of the engine 100, particularly the cylinder head 170 and the carburetor 510. Additionally, in accordance with an embodiment of the present invention, an additional component 520 is shown, which upon assembly of the engine 100 is positioned in between the cylinder head 170 and the carburetor 510. As shown, the component 520 includes a tongue 530 and a flange 540 that are integrally formed. When the component 520 is assembled to the cylinder head 170, the tongue 530 protrudes into the intake port 200 while the flange 540 extends outward around an end of the intake port and is positioned so that a first surface 545 of the flange abuts an outer surface 550 of the cylinder head 170. Upon assembly of the engine 100, the carburetor 510 in turn abuts a second side 555 of the flange 520 opposite the first side. During operation of the engine 100, a mixture of air and fuel output by the carburetor 510 is communicated through an orifice 560 in the component 520 into the intake port 200.

Figure 11:
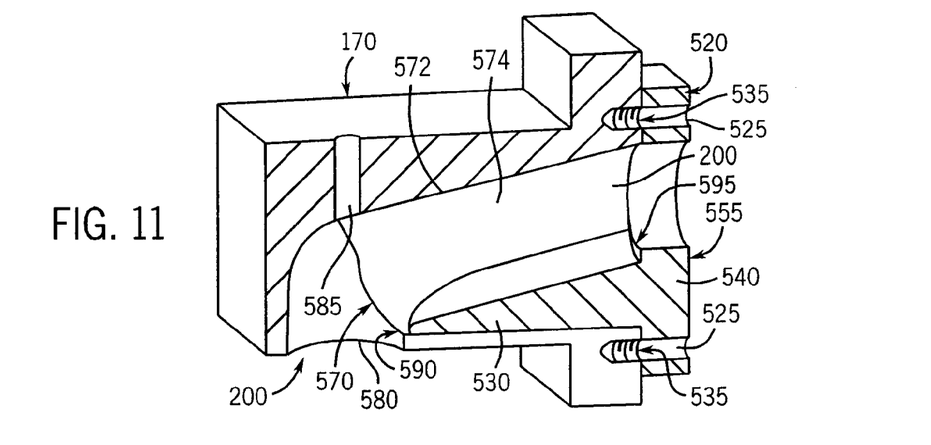
FIG. 11 is a cross-sectional view of a portion of the cylinder head and the additional component of FIGS. 9 and 10, which in particular shows a tongue of the additional component protruding into the intake port of the cylinder head.

Referring to FIG. 11, a cross-sectional view of a portion of the cylinder head 170 and the additional component 520 is provided, taken when the two parts are assembled to one another. As shown, the intake port 200 of the cylinder head 170 is largely L-shaped and is formed from a first channel 570 and a second channel 580 that intersect one another at approximately a 90 degree angle. A further channel 585 extends away from the intersection of the first and second channels 570,580 substantially parallel to the second channel, where the further channel has a significantly smaller diameter than either of the first and second channels and serves as a guide for the intake valve 240. The additional component 520 is attached to the cylinder head 170 by way of bolts (not shown) that protrude through aligned bolt holes 525 and 535 of the flange 540 and the cylinder head, respectively. In alternate embodiments, the component 520 and cylinder head 170 can be attached to one another by other conventional attachment devices or mechanisms, e.g., by way of screws, welding, adhesives, etc.

The orientation of the surface of the intake port 200 changes abruptly as one proceeds from the first channel 570 to the second channel 580. In particular, a corner 590 is formed along the inner surface of the L-shaped intake port. However, further as shown in FIG. 11, the tongue 530 protrudes from an end 595 of the intake port 200 up to, or nearly up to, the corner 590. The tongue 530, which is positioned along (and, in some embodiments, is supported by) a portion of the wall of the intake port 200, decreases in thickness as one proceeds from the end 595 to the corner 590. The tongue 530 serves to reduce the abruptness in the surface of the intake port 200 as one proceeds from the first channel 570 to the second channel 580, particularly at the corner 590. The tongue 530 also serves to shape the channel 570 for optimum (least restrictive) flow. It is not intended that significant flow should occur between the tongue 530 and the wall of the intake port 200 along which the tongue is positioned. Rather, flow occurs exclusively (or at least primarily) within a modified passage 574 formed by the tongue 530 and the first channel 570. As a result of these changes to the intake port 200 due to the tongue 530, volumetric efficiency is increased and improved engine power (higher horsepower) results.

Because of the existence of the tongue 530, the flow of air-fuel mixture from the carburetor 510 into the cylinder 160 by way of the intake port 200 is not disrupted as much as it otherwise would be due to the abrupt intersection of the first and second channels 570,580. In particular, the flow of air-fuel mixture does not experience (or at least does not experience as much) stalling in the presence of the tongue 530 as would otherwise be the case without the tongue due to the corner 590. As a result, the tongue 530 tends to prevent separation or divergence of the flowing air-fuel mixture, and thus causes the air-fuel mixture to be more evenly provided to all portions of the cylinder 160. This is in contrast to conventional cylinder heads that do not employ the tongue, which tend to distribute more of the air-fuel mixture to the side of the cylinder opposite the corner 590.

Depending upon the embodiment, the first and second channels 570,580 can have any of a number of shapes. Commonly, the channels 570,580 are cylindrical or conical. In particular as shown in FIG. 11, in some embodiments the first channel 570 has a tapered surface 572 opposite the surface at which the tongue is to be positioned, such that the first passage is elliptical in cross-section and decreases in cross-sectional area as one proceeds toward the inner 90 degree corner. In certain of these embodiments, as shown in FIG. 11, the addition of the tongue tends to create a modified passage that is largely cylindrical and that intersects the second passage 580 at greater than 90 degrees.

As discussed, the flange 540 of the additional component 520 is positioned in between the carburetor 510 and the cylinder head 170 upon assembly of the engine 100. In a preferred embodiment, the additional component 520 or at least the flange 540 is made from a heat resistant material such that the flange serves as a heat barrier and retards heat transfer from the cylinder head to the carburetor. This is desirable since the cylinder head can be one of the hottest portions of the engine 100 during operation, and yet it is undesirable that the carburetor 510 become very hot or experience significant changes in its temperature since this can affect the performance of the carburetor, which in turn can affect the air-fuel mixture composition and thus affect engine performance. A variety of heat resistant materials can be used for the component 520/flange 540 including, for example, polymers.

Turning to FIGS. 12–19, alternate embodiments of the additional component 520 are shown, particularly a component 620 shown in FIGS. 12–15 and another component 720 shown in FIGS. 16–19. As shown specifically with respect to FIGS. 12–15, the component 620 includes, in addition to a tongue 630 and a flange 640, a baffle 650 that extends outward away from the flange 640 (the baffle can be considered an extension of the flange). As shown most clearly in FIG. 14, which is a side view of the component 620, the baffle 650 includes a lower portion 670 that curves downward around and under the tongue 630 and an upper portion 680 that curves upward and away from the tongue. Consequently, when the engine 100 is assembled such that the flange 640 is positioned between the cylinder port 170 and the carburetor 510 (with the tongue 630 positioned in the intake port 200 of the cylinder head), air blown downward by the fan 130 toward the cylinder 160 and cylinder head 170 is directed or funneled toward the cylinder/cylinder head and away from the carburetor 510 (as shown by the arrows shown alongside the baffle 650 in FIG. 14). The baffle 650, by virtue of its relatively large surface area, generally also limits air flow between the cylinder 160/cylinder head 170 and the carburetor, and thus prevents excessive heat transfer toward the carburetor that might otherwise occur due to such air flow. Thus, assuming that the flange 640 (and also possibly the baffle 650) is made from a heat resistant material as discussed above, the carburetor 510 is doubly protected from receiving heat from the cylinder 160/cylinder head 170 both in terms of heat flow occurring through the engine parts and in terms of heat flow by way of the air.

Figure 12:
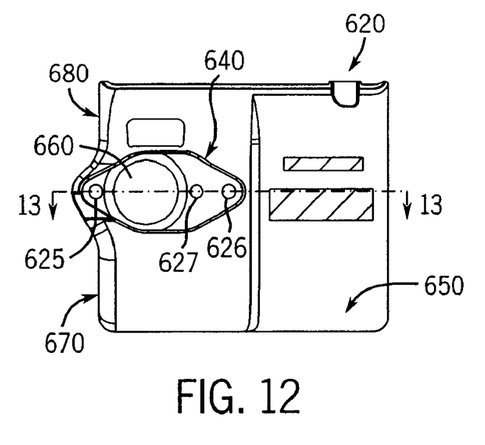
FIGS. 12 and 16 are front elevation views of two alternate embodiments of the additional component to be coupled between the cylinder head and carburetor of FIGS. 9–11.
Figure 13:
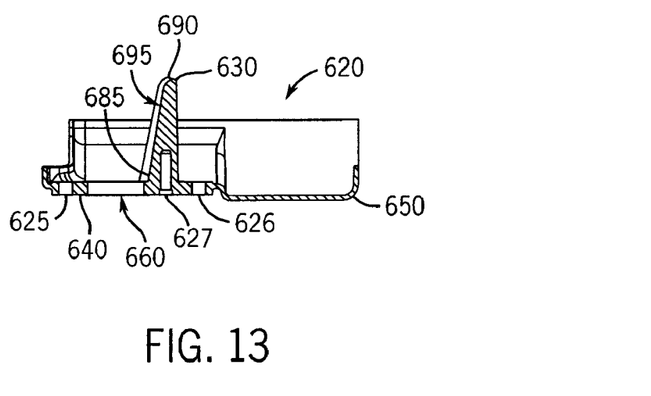
FIGS. 13 and 17 are cross-sectional views of the additional components of FIGS. 12 and 16 taken along lines 13—13 and 17—17 of those Figs., respectively.
Figure 14:
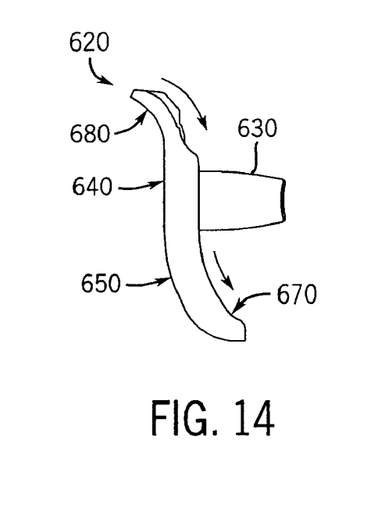
FIGS. 14 and 18 are side elevation views of the additional components of FIGS. 12 and 16, respectively.
Figure 15:
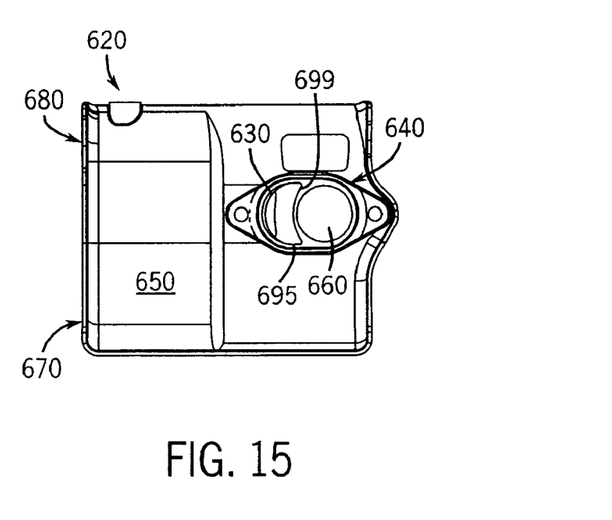
FIGS. 15 and 19 are rear elevation views of the additional components of FIGS. 12 and 16, respectively.

Referring particularly to FIG. 13, which is a cross-sectional view of the component 620 taken along line 13—13 of FIG. 12 (which is a front view of the component) the tongue 630 of the component 620 is shown to have a particular cross-sectional shape. Specifically, the tongue 630 includes an inward step 685 where the tongue meets the flange 640, a tip 690, and an intermediate portion 695 that is tapered in a gradual manner so that the thickness of the tongue is reduced as one proceeds from the flange 640 to the tip 690. The tip 690 itself is rounded and, in one embodiment, the rounded portion of the tip has a 6 mm radius. The intermediate portion 695 extends at least three-quarters of the length of the tongue 630, from the step 685 to the tip 690.

Figure 16:
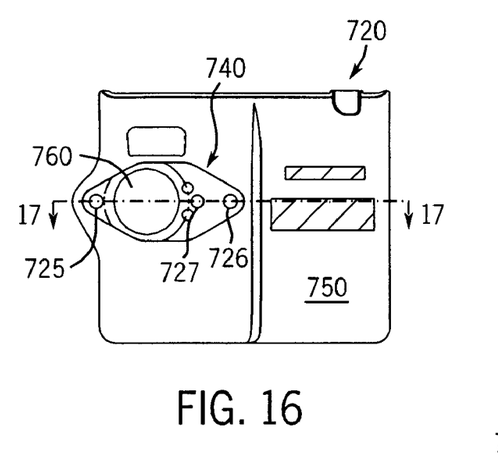
Figure 17:
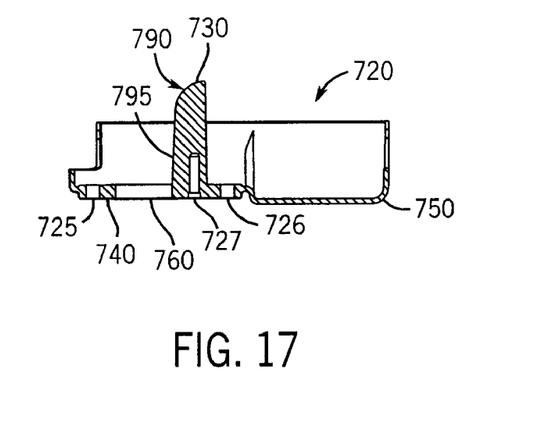
Figure 18:
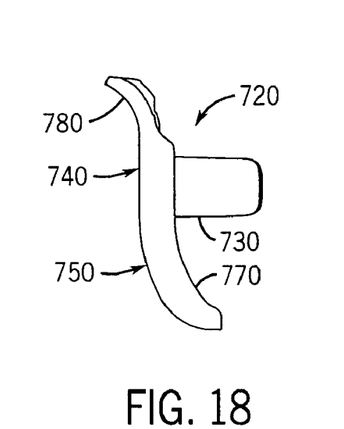
Figure 19:
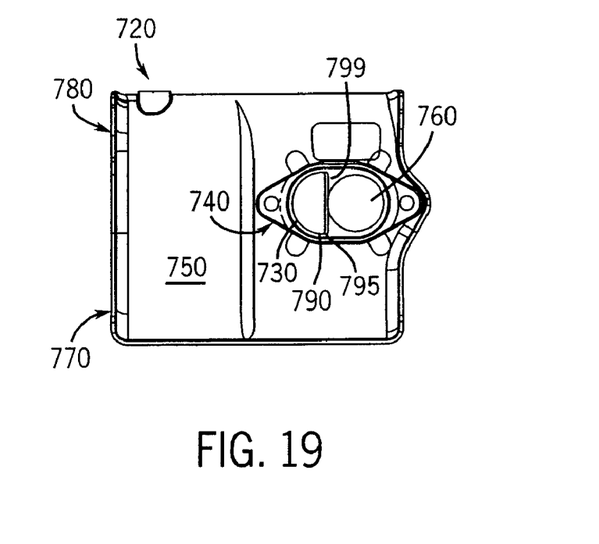

Referring to FIGS. 16–19, the component 720 is shown to have a flange 740 and baffle 750 that are substantially the same as the flange 640 and baffle 750 of the component 620. In particular, the baffle 750 again includes a lower portion 770 that curves downward under a tongue 730 of the component and an upper portion 780 that curves upward away from the tongue. Though sharing these similarities, the tongue 730 of the component 720 (as shown in FIG. 17) has a different shape than the tongue 630 of the component 620. In particular, the tongue 730 does not have a step corresponding to the step 685. Also, while the tongue 730 has a rounded tip 790, the tip 790 is larger than the tip 690 of the component 620 in relation to the overall size of the tongue, e.g., the tip 790 occupies at least ¼ of the length of the tongue. In one embodiment of the component 720 that has the same overall size as the embodiment of the component 620 in which the tip 690 has a 6 mm radius, the tip 790 has a 15 mm radius. Additionally, the tongue 730 has a substantially flat portion 795 extending from the flange 740 to the tip 790 (typically greater than half the length of the tongue). The substantially flat portion 795, in contrast to the intermediate portion 695, is only slightly tapered (if at all), such that the thickness of the tongue only slightly decreases as one proceeds from the flange 740 toward the tip 790. Further as shown particularly by FIGS. 15 and 19, the tongues 630 and 730 also differ in that, while the intermediate portion 695 has a concave surface 699 as viewed from the front of the tongue 630, the substantially flat portion 795 has a flat surface 799 as viewed from front of the tongue 730.

The differently-shaped tongues 630,730 have somewhat different effects upon the air-fuel mixture flowing in through the respective orifices 660,760 of the respective flanges 620,720. In particular, the tongue 630 of the component 620 produces relatively more tumble of the air-fuel mixture as it flows down the tongue (such that the mixture swirls end-over-end to some extent). Because of this tumbling action, the air-fuel mixture becomes more thoroughly mixed, which in turn produces a more complete and faster burn within the cylinder 160. In contrast, the tongue 730 of the component 720 produces relatively less turbulence and instead causes less of a divergence of the flowing air-fuel mixture as it reaches the cylinder 160. Consequently, the air-fuel mixture is relatively more evenly provided to the cylinder 160 than in the case of the tongue 630 (although even that tongue provides the air-fuel mixture more evenly than in the absence of the tongue), so that the portion of the cylinder 160 closer to the corner 590 is not deprived of the air-fuel mixture in comparison with other portions of the cylinder. Because the air-fuel mixture is more evenly provided to the cylinder, effectively more of the air-fuel mixture is provided to the cylinder. Each of the tongues 630,730 increases the overall power generated by the engine 100 over what it would be in the absence of the tongues, although the tongue 630 improves engine power by providing an air-fuel mixture that is both relatively evenly distributed and thoroughly mixed, while the tongue 730 improves engine power by very evenly distributing the actual mixture and thereby maximizing the effective amount of air-fuel mixture that is supplied to the engine.

As discussed, the flanges 540,640 and 740 of the components 520,620 and 720 are positioned between the carburetor 510 and the cylinder head 160 when assembled in the engine 100. As discussed, the component 520 shows the two bolt holes 525 within the flange 540 (above and below the tongue 530) allowing for bolts to extend all of the way from the carburetor 510 to the cylinder head 160 to attach the three parts together. In contrast, the flange 640 shows three bolt holes 625,626, and 627 and the flange 740 shows three bolt holes 725,726 and 727. As in the case of the bolt holes 525, the bolt holes 625,725 are respectively configured to receive a bolt that extends from the carburetor 510 through the respective flanges 640,740 to the cylinder head 170 and attaches the parts to one another. However, the bolt holes 626,726 are intended to receive bolts that only affix the respective flanges 640,740 to the cylinder head 170. It is the bolt holes 627,727 that are intended to receive bolts that in turn affix the carburetor 510 to the respective flanges 640, 740. As shown, the bolt holes 627,727 extend into and terminate within the respective tongues 630,730. Consequently, in the case of the flanges 640,740, only one bolt connects the cylinder head 170 to the carburetor 510, and thus the cylinder head and carburetor are further isolated from one another in terms of the transfer of heat therebetween.

In the present embodiment, the engine 100 is a single cylinder vertical shaft internal combustion engine capable of outputting 15–20 horsepower for implementation in a variety of consumer lawn and garden machinery such as lawn mowers and lawn and garden tractors. In alternate embodiments, the engine 100 can also be implemented as a two-cylinder (or multiple cylinder) vertical shaft engine such as a V-twin engine or an inline twin cylinder engine, and/or be implemented in a variety of other types of (e.g., 4-cylinder) machines. Further, in alternate embodiments, the particular arrangement of parts within the engine 100 can vary from those shown and discussed above. For example, in one alternate embodiment, the cams 360 could be located above the gears 320 rather than underneath the gears.

In alternate embodiments, the configuration of the additional component in between the cylinder head 170 and the carburetor 510 can vary from the exemplary embodiments 520,620 and 720. In particular, the size and shape of the tongue can vary from the tongues 530,630 and 730 depending upon the size and shape of the intake port 200 and also upon the particular flow characteristics that are desired with respect to the flow of the air-fuel mixture. The size and shape of the flange can also be varied from that of the flanges 540,640 and 740. For example, while the flanges 540,640 and 740 each have a shape that is substantially elliptical (corresponding generally to the cross-sectional shape of the intake port 200), in alternate embodiments the shape could be rectangular. Additionally, the size and shape of the baffle could vary from that of baffles 650,750.

While the foregoing specification illustrates and describes the preferred embodiments of this invention, it is to be understood that the invention is not limited to the precise construction herein disclosed. The invention can be embodied in other specific forms without departing from the spirit or essential attributes of the invention. Accordingly, reference should be made to the following claims, rather than to the foregoing specification, as indicating the scope of the invention.

What is claimed is:

1. A cylinder head assembly comprising:
   a cylinder head including a first port having a first passage linking a first end to an intersection, and a second passage linking a second end to the intersection, wherein the intersection includes an abrupt transition between the first and second passages; and
   a component coupled to the cylinder head, the component including a tongue that protrudes into the first passage from the first end to proximate the intersection, wherein the tongue is positioned along at least a portion of an inner side of the first passage, and wherein the tongue is gradually-reduced in thickness at least proximate the intersection.

2. The cylinder head assembly of claim 1, wherein the component includes a flange coupled to the tongue that extends over at least a portion of an exterior surface of the cylinder head.

3. The cylinder head assembly of claim 2, wherein the flange includes a first hole and the exterior surface of the cylinder head includes a second hole, wherein component is coupled to the cylinder head by way of a bolt that extends through the first and second holes, the holes being aligned when the component is coupled to the cylinder head.

4. The cylinder head assembly of claim 2, wherein the flange is configured to be coupled to a carburetor, and wherein when the flange is coupled to the carburetor, the flange is positioned in between the carburetor and the cylinder head and separates the carburetor from the cylinder head.

5. The cylinder head assembly of claim 4, wherein the flange is made of a heat resistant material that limits heat transfer from the cylinder head to the carburetor.

6. The cylinder head assembly of claim 5, wherein the heat resistant material is a polymer.

7. The cylinder head assembly of claim 4, wherein the flange includes a hole configured to receive a bolt by which the carburetor is attached to the flange, wherein the hole extends into an interior of the tongue.

8. The cylinder head assembly of claim 2, wherein the flange of the component extends outward beyond the cylinder head to form a baffle.

9. The cylinder head assembly of claim 8, wherein a cross-section of the baffle is substantially S-shaped.

10. The cylinder head assembly of claim 8, wherein the baffle extends outward in a first direction and then proceeds to curve around the cylinder head.

11. The cylinder head assembly of claim 10, wherein the flange is configured to be coupled to a carburetor, wherein when the flange is coupled to the carburetor, the baffle extends outward in a second direction and then proceeds to curve around the carburetor, wherein the second direction is substantially opposite the first direction.

12. The cylinder head assembly of claim 11, wherein the baffle extends outward away from the first port in third and fourth directions that are each substantially perpendicular to the first and second directions.

13. The cylinder head assembly of claim 11, wherein the baffle precludes at least some air flow from the cylinder head to the carburetor, and wherein the baffle is positioned to direct air flow emanating from a fan toward the cylinder head and not toward the carburetor.

14. The cylinder head assembly of claim 1, wherein an outer surface of the tongue is substantially flat for at least half of an overall length of the tongue, and substantially rounded for approximately one-quarter of the overall length of the tongue, wherein the substantially rounded portion of the tongue is closer to the intersection than the substantially flat portion of the tongue.

15. The cylinder head assembly of claim 1, wherein an outer surface of the tongue includes a step, a tapered portion, and a rounded portion, wherein the step is proximate the first end, the rounded portion is proximate the intersection, and the tapered portion is in between the step and the rounded portion, wherein the tapered portion is substantially flat over a length greater than three-quarters of an overall length of the tongue.

16. The cylinder head assembly of claim 1, wherein the first passage includes a tapered side opposite the inner side, and wherein a modified passage formed by the first passage and the tongue is substantially cylindrical and intersects the second passage at greater than 90 degrees.

17. A component for implementation in a port within a cylinder head of an internal combustion engine, wherein the port includes an abrupt transition region, the component comprising:

means for protruding into the port of the cylinder head to at least a point that is proximate the abrupt transition region and limiting stalling of a flow of air-fuel mixture within the port that otherwise would occur as the air-fuel mixture flowed along the abrupt transition region.

18. The intermediate component of claim 17, wherein a portion of the component is positioned in between the cylinder head and a carburetor of the engine, and further comprising:

means for buffering the cylinder head and the carburetor to limit heat transfer therebetween, and means for limiting air flow from the cylinder head toward the carburetor and directing air flow from a fan of the engine toward the cylinder head and not toward the carburetor.

19. A method of providing an air-fuel mixture from a carburetor to a cylinder of an internal combustion engine, the method comprising:

providing a cylinder head with an L-shaped intake port formed by first and second channels that interconnect at an abrupt intersection, wherein a first end of the L-shaped intake port is coupled at least indirectly to the carburetor to receive the air-fuel mixture from the carburetor, and wherein a second end of the L-shaped intake port is coupled to the cylinder;

providing a tongue within the first channel of the L-shaped intake port between the first end and the intersection, wherein an internal volume of the L-shaped intake port that is open for conducting the air-fuel mixture is reduced by the tongue;

providing the air-fuel mixture from the carburetor to the first end of the L-shaped intake port;

directing the air-fuel mixture through the internal volume of the L-shaped intake port as reduced by the tongue;

communicating the air-fuel mixture past an open valve and into the cylinder, wherein an abruptness of the abrupt intersection between the first and second channels is reduced by the tongue.

20. The method of claim 19, wherein the tongue is coupled to a flange that is positioned between and separates the cylinder head and the carburetor, wherein the flange is made of a heat resistant material that reduces an amount of heat transfer between the cylinder head and the carburetor.

21. The method of claim 20, wherein the flange extends outward to form a baffle that restricts air flow between the cylinder head and the carburetor.

22. A component for implementation in a passage within a cylinder head of an internal combustion engine, wherein the passage includes an abrupt transition region, the component comprising:

a device that is fixed in relation to the cylinder head and protrudes into the passage so that flow along the abrupt transition region proceeds with less stalling than would otherwise occur if the device were absent.

23. A component for implementation between a cylinder head and a carburetor of an engine, the component being fixed in relation to at least one of the cylinder head and the carburetor, the component comprising:

a first portion that buffers the cylinder head and the carburetor with respect to one another in order to limit heat transfer therebetween, and a second portion that limits air flow from the cylinder head toward the carburetor and directs at least some air flow from a fan of the engine toward the cylinder head rather than toward the carburetor.

* * * * *